(12) United States Patent
Bourdev (10) Patent No.: US 8,041,076 B1
(45) Date of Patent: Oct. 18, 2011

(54) GENERATION AND USAGE OF ATTRACTIVENESS SCORES

(75) Inventor: Lubomir Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1104 days.

(21) Appl. No.: 11/891,547

(22) Filed: Aug. 9, 2007

(51) Int. Cl.
*G06K 9/00* (2006.01)

(52) U.S. Cl. .................................. 382/103; 382/118

(58) Field of Classification Search .......... 382/103, 382/118
See application file for complete search history.

(56) References Cited

U.S. PATENT DOCUMENTS

| | | | |
|---|---|---|---|
| 2003/0156304 A1* | 8/2003 | Fedorovskaya et al. | 358/527 |
| 2004/0197013 A1* | 10/2004 | Kamei | 382/118 |
| 2007/0094686 A1* | 4/2007 | Kim et al. | 725/45 |
| 2007/0122036 A1* | 5/2007 | Kaneda et al. | 382/190 |
| 2008/0037841 A1* | 2/2008 | Ogawa | 382/118 |
| 2008/0101660 A1* | 5/2008 | Seo | 382/118 |

OTHER PUBLICATIONS

Hussein et al. "Studying Facial Expressions as an Implicit Feedback in Information Retrieval Systems", pp. 1-11, Department of Computer Science, College Park, MD, 2004.
Del Valle "Online Face Analysis: Coupling Head Pose-Tracking with Face Expression Analysis", pp. 414-415, Institut Eurecom, Multimedia Communications Department, Dec. 2002.

* cited by examiner

*Primary Examiner* — Tom Y Lu
(74) *Attorney, Agent, or Firm* — Van Pelt, Yi & James LLP (57) ABSTRACT

A digital image is obtained. A face depicted in the digital image is detected. A set of characteristics is obtained, where the set of characteristics are associated with at least some portion of a face. An attractiveness score is generated based at least in part on the detected face and the set of characteristics.

35 Claims, 8 Drawing Sheets

GENERATION AND USAGE OF ATTRACTIVENESS SCORES

BACKGROUND OF THE INVENTION

Digital cameras and other devices that capture digital images are popular compared to older devices, such as 35 mm cameras. For example, digital images can be easily shared with other people by uploading them to a website where other people can access the images or by sending them as attachments to an email. Although there are devices and applications that generate and/or operate on digital images, it would be desirable to develop techniques that, for example, further improve a user's ability to take desirable or quality digital images and/or enable a user to locate quality or attractive digital images in a large collection of images (e.g., a professional wedding photographer's entire portfolio).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
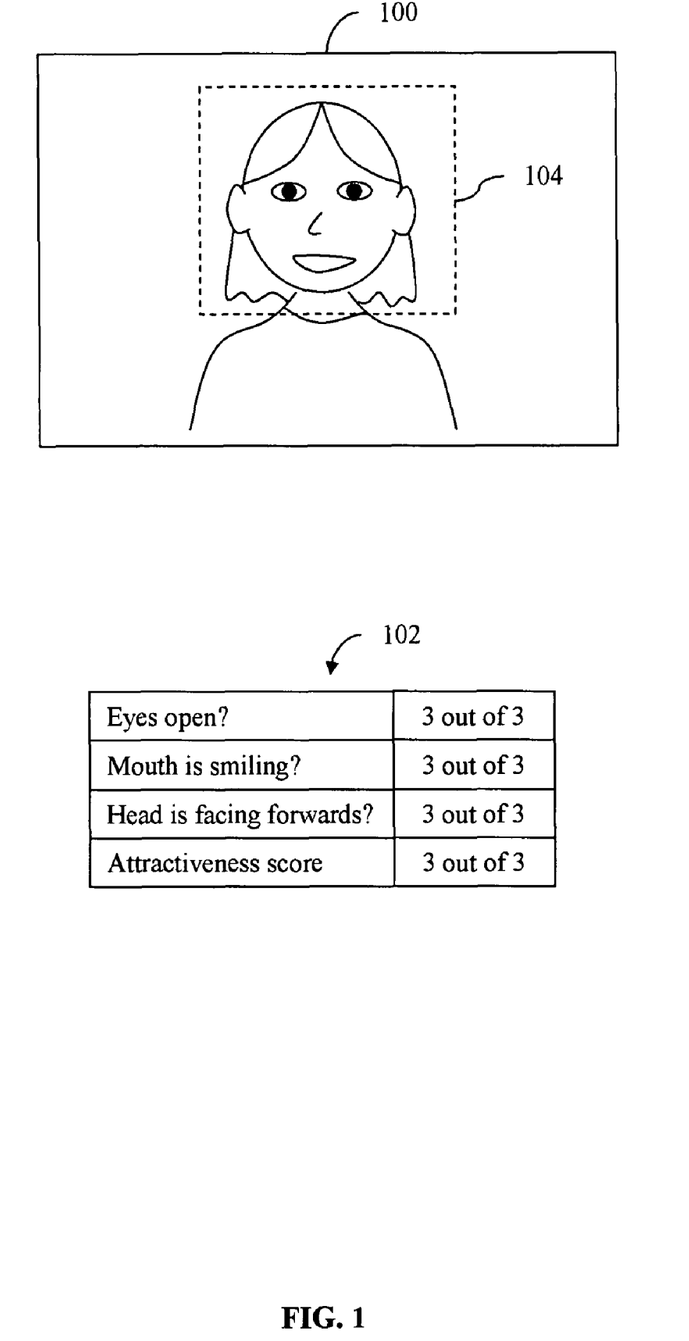
FIG. 1 is a diagram illustrating an embodiment of a digital image for which an attractiveness score is generated using three characteristics.

FIG. 1 is a diagram illustrating an embodiment of a digital image for which an attractiveness score is generated using three characteristics. In various embodiments, a digital image (e.g., image 100) is a Joint Photographic Experts Group (JPEG) file, a Graphics Interchange Format (GIF) file, etc. In some embodiments, the techniques described herein are applied to video, such as a Moving Picture Experts Group (MPEG) file.

As used herein, an attractiveness score is a quantity or value representing the degree or amount a face or head depicted in a digital image is pleasing, attractive, or desirable. For example, non-head portions depicted in a digital image do not necessarily affect an attractiveness score. An attractiveness score is generated using a set of characteristics or factors associated with a head or face upon which a face or head is judged or otherwise evaluated. Table 102 shows one embodiment of such characteristics. In that example, an attractiveness score is based on if a person's eyes are open, their mouth is smiling, and their head is facing forward. In this example, a value indicating the degree to which a certain characteristic is present or not present in an image is determined and the values are used to generate an attractiveness score. Digital image 100 receives a three out of three for all categories/characteristics and the attractiveness score is similarly a three out of three. In this embodiment, the attractiveness score is an average of the values for each of the characteristics.

In various embodiments, various categories or characteristics are used to calculate or generate an attractiveness score. For example, the characteristics shown in table 102 may be useful in selecting a headshot of a person that other people will see, for example in a social network website, a dating service, or in a photo greeting card. In other embodiments, a different set of characteristics compared to those shown in table 102 are used. For example, some passport agencies require at least one ear to be shown in passport photographs but do not necessarily care if the person is smiling. In that application, an attractiveness score may be based on whether an ear is shown but not necessarily on smiling.

In some embodiments, an attractiveness score is generated by an application associated with editing, storing, managing, and/or searching through digital images or video, such as Adobe® Photoshop®, Adobe® Bridge, etc. In some embodiments, an attractiveness score is generated by a device, such as a camera, telephone, etc.

In some embodiments, a digital image includes multiple faces. In some embodiments, a single attractiveness score is generated for a digital image with multiple faces. In some embodiments, only faces or heads that are larger than a certain size and/or that are relatively centered in the digital images are considered in a single attractiveness score for a digital image that includes multiple faces. In some embodiments, attractiveness scores are generated for two or more heads or faces in a digital image. In some embodiments, attractiveness scores are not generated for heads that are smaller than a certain size and/or are located too far from the center of the digital image. For example, such heads may have a tendency to be strangers who were not intended to be included in the picture.

In some embodiments, an attractiveness score is stored in metadata associated with a digital image. This may be useful because then one device or application is able to generate an attractiveness score and another device or application is able to make a decision based on the attractiveness score or, more generally, use the attractiveness score. One example of metadata is Adobe's Extensible Metadata Platform (XMP). In various embodiments, other information is stored in metadata with an attractiveness score, such as an application (e.g., Adobe Photoshop) or device (e.g., a camera manufacturer and model number) that generated an attractiveness score, the day and/or time an attractiveness score was generated, a maximum attractiveness score, a description of the characteristics or factors used to generate the attractiveness score (e.g., open eyes, smiling mouth, etc.), and/or the corresponding scores or values for those characteristics or factors (if generated).

Although in this example an intermediate step of determining values (e.g., 0 thru 3) for each characteristic is shown, in some embodiments, an attractiveness score is generated without necessarily generating or calculating a value or score for each characteristic.

Figure 2:
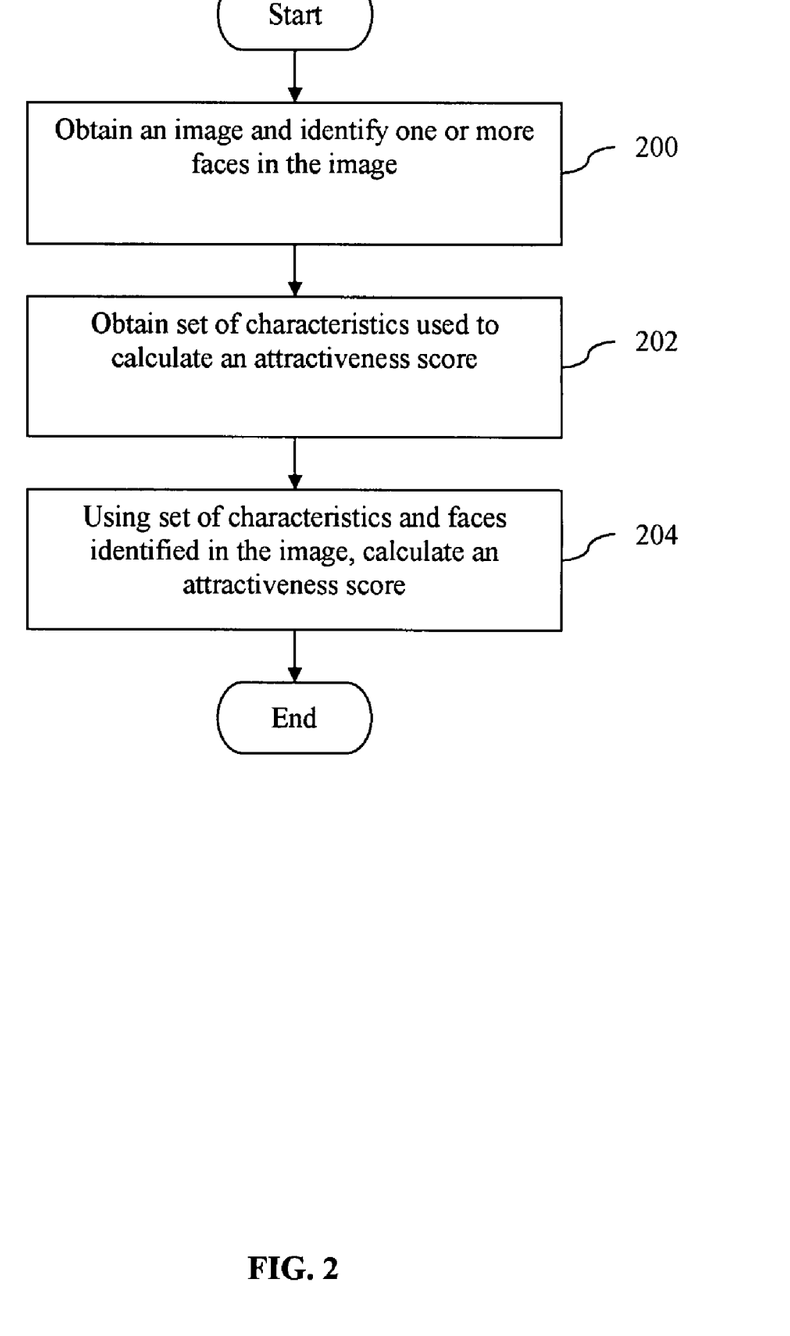
FIG. 2 is a flowchart illustrating an embodiment of a process for generating an attractiveness score.

FIG. 2 is a flowchart illustrating an embodiment of a process for generating an attractiveness score. In the example shown, the process may be performed by an application (e.g., Adobe Photoshop) or a device (e.g., a camera). In some embodiments, the example process is modified to operate on video.

At 200, an image is obtained and one or more faces in the image are identified. In some embodiments, a face is detected by finding and/or using an axis of symmetry. In some embodiments, an axis of symmetry is found by comparing the pixel values for two points in a digital image. If they are corresponding points, the pixel values are (substantially) the same value or color, and the axis of symmetry runs along the midpoint of the two points. In some embodiments, a rectangle or other shape that includes an identified face is output at step 200 for each face identified in an image. For example, the (x, y) coordinates of the four corners of rectangle 104 in FIG. 1 may be output at step 200.

A set of characteristics used to calculate an attractiveness score is obtained at 202. Some examples of characteristics used to generate an attractiveness score include: orientation of the head (e.g., the degree to which a person's head is facing forwards), smiling, blinking, exposed ears, size of the head, location of the head (e.g., in the center of the digital image or at the edge of the digital image), or other characteristics or properties of the head, eye, mouth, brow/forehead, ears, etc.

In some embodiments, a set of characteristics are predefined and/or stored in a device or application's memory. In some embodiments, a user is able to specify or select which characteristics or features used to generate an attractiveness score. For example, for one application it may not matter whether a person is smiling but for another application it may be important. In some embodiments, a user is able to specify other settings related to generating an attractiveness score. For example, in some embodiments an attractiveness score is a weighted linear function of the individual scores for each characteristic and in some such embodiments a user is able to specify one or more of the weights.

At 204, a set of characteristics and faces identified in the image are used to calculate an attractiveness score. In some embodiments, an attractiveness score is a weighted average of individual scores for each characteristic. For example, in table 102 of FIG. 1, an average is used. In some embodiments, an attractiveness score is some non-linear function.

Some other techniques identify faces and/or determine a position or expression of a face. In one technique, a learning algorithm is presented with cropped images of faces and non-faces and it is trained to recognize a face from a 2D image. In another technique, a 3D model of the face is constructed and the target image is searched for 2D projections of the model. In some embodiments, training is used in some or all of steps 200-204. The following figure shows one embodiment of training.

Figure 3:
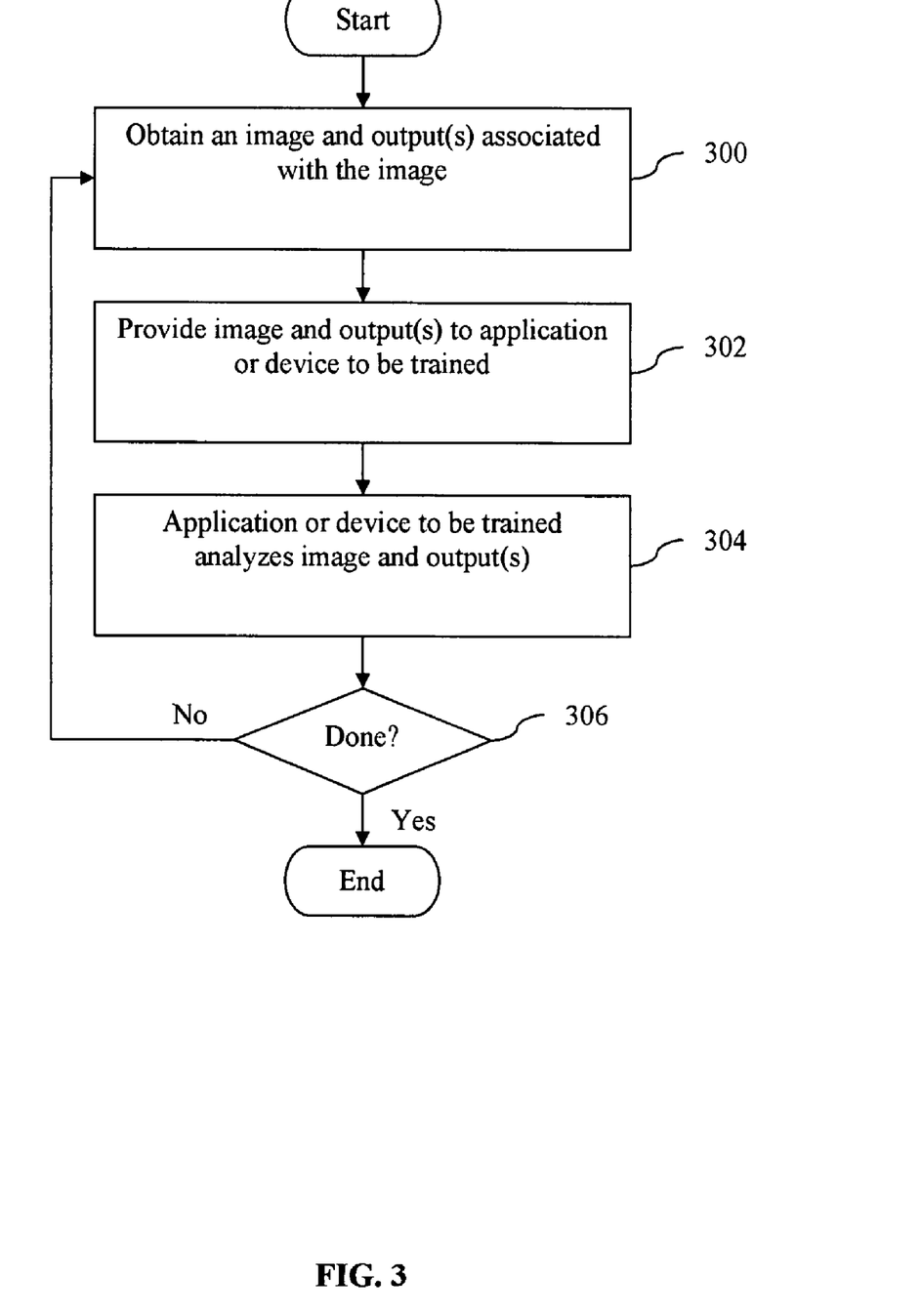
FIG. 3 is a flowchart illustrating an embodiment of training.

FIG. 3 is a flowchart illustrating an embodiment of training. In some embodiments, a process or component is trained to identify faces in an image (e.g., step 200 of FIG. 2). In some embodiments, a learning machine is trained to determine a value of a characteristic used to generate an attractiveness score (e.g., step 202 of FIG. 2). Examples of such characteristics include recognizing whether the eyes are open or closed, whether the person is smiling or serious, etc. In some embodiments, an attractiveness score is determined directly without first determining intermediate or lower-level values or scores (i.e., step 202 in FIG. 2 is skipped); in some such embodiments, a process or device is training to (directly) generate an attractiveness score.

At 300, an image and output(s) associated with the image are obtained. For example, if training is related to determining values for characteristics used to generate an attractiveness score, image 100 and eye open=3, smiling=3, and head facing forwards=3 are obtained at 300.

In some embodiments, images that are used in training show extreme (e.g., minimum or maximum) examples or outputs. For example, a digital image with wide open or completely closed eyes is used in some embodiments as opposed to digital images with partially open eyes.

At 302, an image and output(s) are provided to an application or device to be trained. In various embodiments, an application or device includes a neural network, AdaBoost, or a support vector machine (SVM) that is trained using the image and output(s) for that image. In various embodiments, a Soft Cascade is used as the training framework. Soft Cascade is not a learning machine (like AdaBoost and SVM) but a framework for using learning machines. At 304, an application or device to be trained analyzes image and output(s). It is determined at 306 if a process is done. If not, a new image and output(s) are obtained at 300.

In some embodiments, training is performed in the following manner. To start with, images containing open and closed eyes are obtained and it is known which images have open eyes and which ones have closed eyes. The images are split into two sets—a training set and a validation set (e.g., each containing images with open and closed eyes). The training images are used for a first training round of the learning machine, such as AdaBoost. After the training round, the learning machine is tested on the validation set. For example, in such embodiments the example process of FIG. 3 may include between steps 304 and 306 an extra step of testing the learning machine using the validation set. Training in some embodiments is repeated until performance on the validation set reaches a peak and begins to decrease or levels out. For example, a decision at 306 may be based on the performance of the learning machine when tested using the validation set.

In various embodiments, training is performed at various points in time. In some embodiments, training is performed during the development of an application or device configured to generate an attractiveness score. Once trained, the device or application is released and sold to the public. In some embodiments, training is able to be performed by a user of a device or application. For example, a user may want to train a device or application based on the preferences of that particular user.

Figure 4:
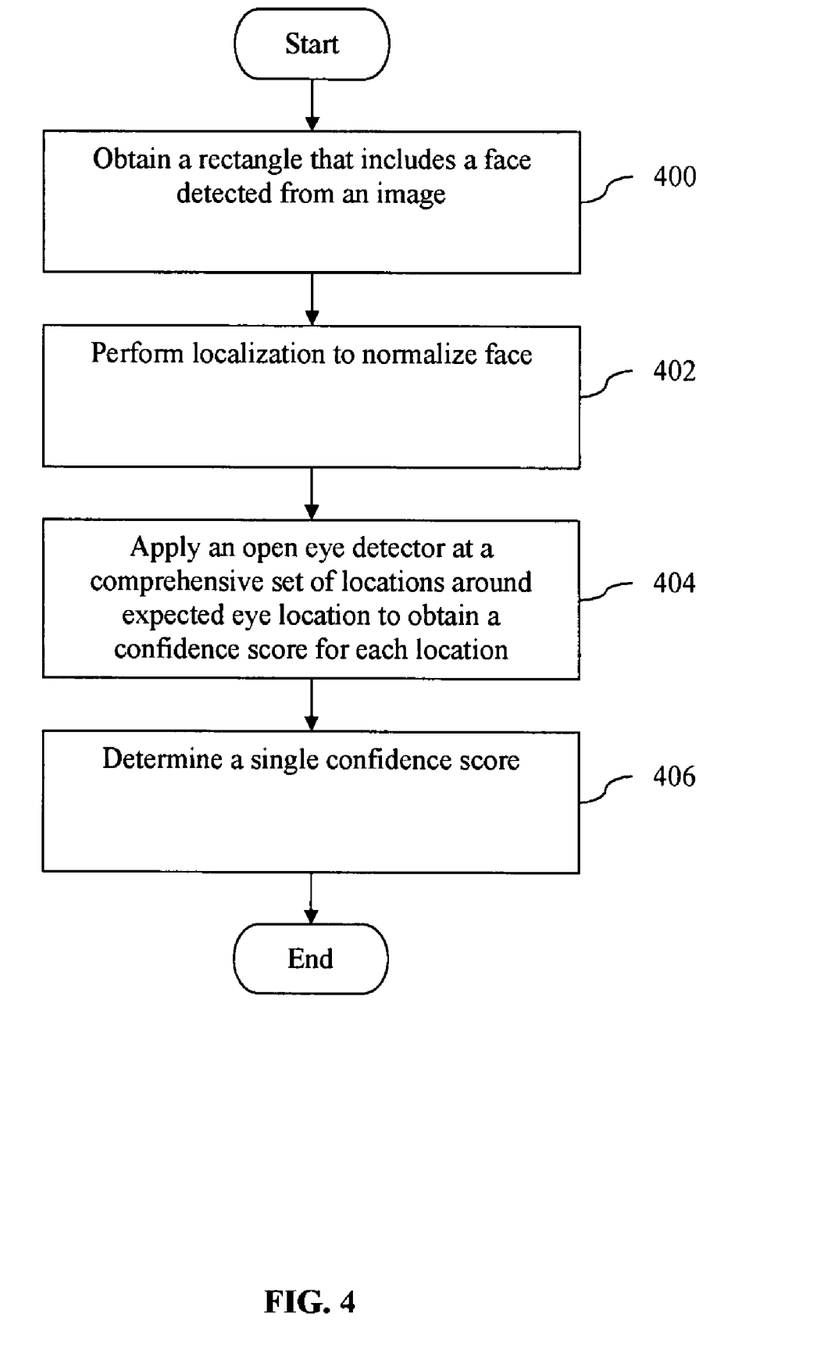
FIG. 4 is a diagram illustrating an embodiment of a process for generating a confidence score for whether a person's eyes are open in a digital image.

FIG. 4 is a diagram illustrating an embodiment of a process for generating a confidence score for whether a person's eyes are open in a digital image. In the example shown, a face detector has already processed the digital image and a rectangle or other shape that includes a face is output by the face detector.

At 400, a rectangle that includes a face detected from an image is obtained. In some embodiments, a trained face detector is used. At 402, localization to normalize a face is performed. For example, suppose two photographers are positioned to the left and right, respectively, of a person and both take a picture. In one image, the person's left half of the face will be more prominent and in the other the right half of the face will be more prominent. In various embodiments, angle, orientation, location/cropping, and/or size are adjusted. For example, faces are rotated so that they are precisely upright (as opposed to slightly tilted), faces are scaled so that the eyes are precisely a standard size, and faces are shifted so they are in the middle of the image. One technique for localization includes computing a dominant gradient direction and using it to rotate the face so the eyes are horizontal. Another technique for localization is to use the axis of symmetry to shift the face (e.g., to the left or right) so it is precisely in the middle of an image. To determine the axis of symmetry, at a given point, the pixels to the left are subtracted from the pixels to the right. The closer the point is to the axis of symmetry, the smaller the difference (e.g., if the point is on the axis of symmetry, the difference is substantially zero).

At 404, an open eye detector is applied at a comprehensive set of locations around an expected eye location to obtain a confidence score for each location. For example, an expected eye location may be the upper half of a face rectangle. In some embodiments, this region is divided into portions (e.g., smaller rectangles) and an open eye detector is applied at each portion so that the entire expected eye location is processed. In some embodiments, the portions overlap. In some embodiments, hard values of 1 or 0 are output at 404. In some embodiments, soft values are output (e.g., a value between 0 and 1).

At 406, a single confidence score is determined. In various embodiments, the (e.g., weighted) average of the confidence scores is used, the highest response is compared to the lowest response, the number of evaluations in which the response exceeds a threshold, (such as 0.5) is counted, etc.

In various embodiments, dividing at least some portion of a detected head into a comprehensive set of smaller pieces and processing the smaller pieces is performed in association with other processes besides determining whether a person's eyes are open. In some embodiments, an ear detector operates on the smaller pieces to determine if (i.e., a hard decision) or a likelihood (i.e., a soft decision) that an ear is present in a given smaller piece of a detected head or face. In some embodiments, a facial expression analyzer operates on the smaller pieces. A facial expression analyzer in some embodiments determines whether a face has a particular or one of a plurality of facial expressions (e.g., happy, serious, angry, frustrated, etc.).

Figure 5:
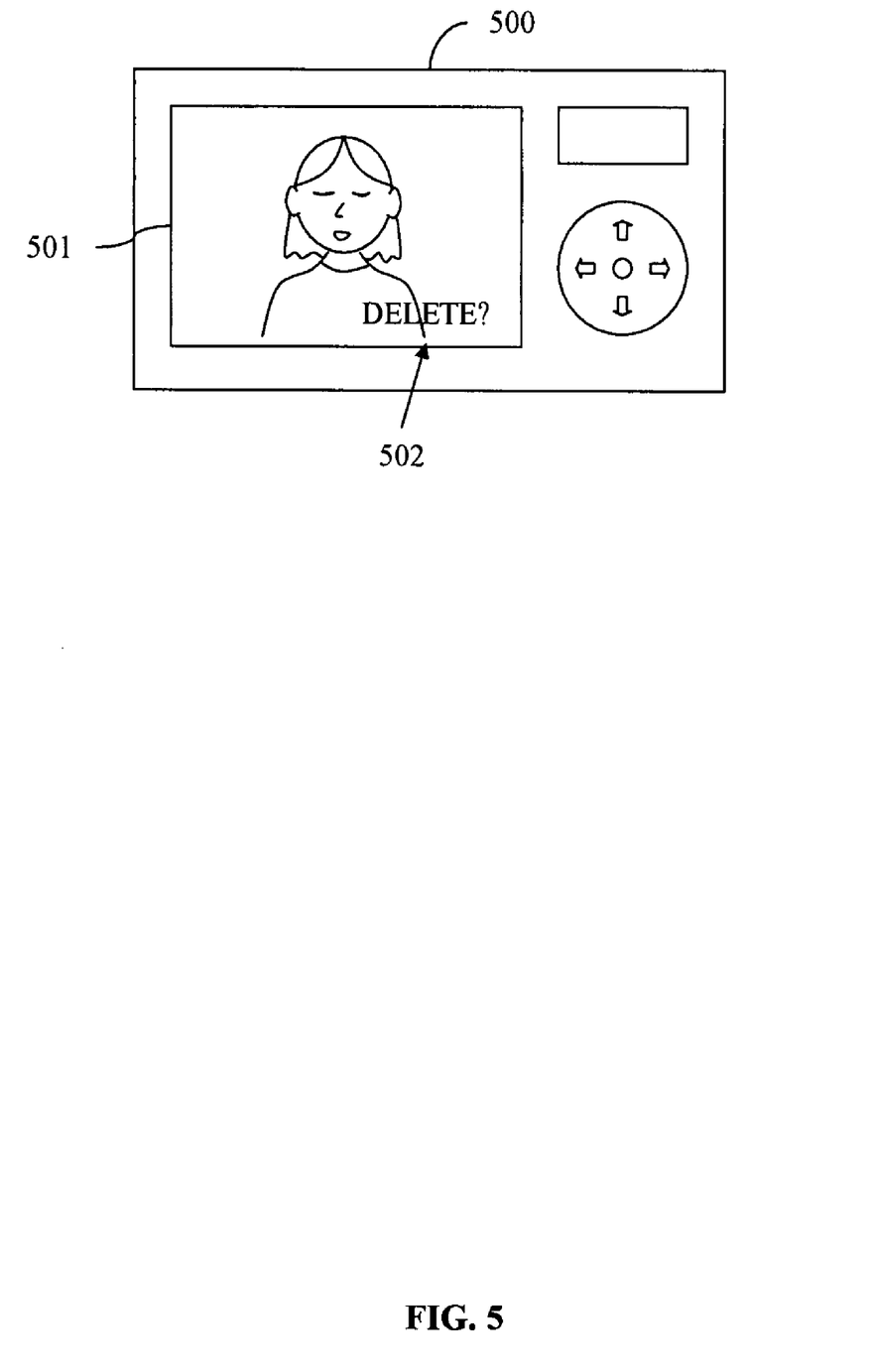
FIG. 5 is a diagram illustrating an embodiment of a digital camera configured to present a delete suggestion based on an attractiveness score.

FIG. 5 is a diagram illustrating an embodiment of a digital camera configured to present a delete suggestion based on an attractiveness score. In the example shown, a user has taken a picture using camera 500. Digital image 501 is displayed on the screen of camera 500. In this example, camera 500 is configured to generate an attractiveness score for each digital image taken by camera 500. In some embodiments, the example process shown in FIG. 2 is used to generate an attractiveness score; in some embodiments some other process is used.

Based on the attractiveness score for a digital image, a decision is made by camera 500 in whether or not to present delete suggestion 502. For example, if large attractiveness scores correspond to attractive or desirable face, no delete suggestion is presented in some embodiments if the attractiveness score for a particular digital image is greater than some threshold. In such embodiments, if an attractiveness score is below a threshold, delete suggestion 502 is displayed on the screen with the corresponding digital image. For example, the person shown in digital image 501 blinked, resulting in an attractiveness score that is lower than the threshold, which in turn causes delete suggestion 502 to be displayed.

In this example, delete suggestion 502 is presented substantially at the same time as image 501. In some cases, delete suggestion 502 or some other message based on an attractiveness score is presented shortly after the photograph is taken; this may be useful to a user, since the event or people captured in a digital image may not be available later on. For example, a person may be taking pictures at a wedding, birthday, or some other special event and would know right away to ask the people to stay for another picture.

In this example, the attractiveness score is not displayed to the user. Alternatively, in some embodiments, an attractiveness score is displayed to the user, for example via the screen of a camera with the corresponding digital image. In some embodiments, more than one face may be presented at a time. For example, all faces whose attractiveness scores are below a given threshold may be presented next to each other.

In some embodiments, some other device besides a camera decides whether to present a suggestion or message (or selects one suggestion/message from a plurality to present) based on an attractiveness score. For example, in some embodiments, a camera phone is configured to generate an attractiveness score and/or present a message based on an attractiveness score. In some embodiments, a handheld device such as a personal digital assistant (PDA) that captures, stores, and/or manipulates digital images is configured to present a message based on a attractiveness score.

In some embodiments, some other message, warning, or display is presented to a user based on an attractiveness score. In some embodiments, a non-visual message is triggered in the event an attractiveness score is low (or high) in addition to or as an alternative to a visual message. In some embodiments, a camera or other device includes a vibrating component and the camera vibrates when an attractiveness score is above/below a threshold. For example, the user may be busy talking to people or looking at other things and he may not necessarily notice delete suggestion 502 or some other visual message. In some embodiments, a chirp, beep, or other audible message is presented based on an attractiveness score.

In some embodiments, a border around a digital image varies based on the attractiveness score for that digital image. For example, a thicker/thinner border may be used to indicate a digital image for which there is a high/low attractiveness score. In some embodiments, a digital image with such a variable border is displayed alone. In some embodiments, a plurality of digital images having such borders is displayed together. Other types of indicators or visual cues corresponding to attractiveness scores are used in various embodiments, such as background colors or shading, a perceived degree of depression or elevation of the image (e.g., within a surrounding workspace or area), a rate of blinking (e.g., slower=higher attractiveness score, faster=lower attractiveness score), a spectrum of colors (e.g., green=higher attractiveness score, red=lower attractiveness score), etc.

Figure 6:
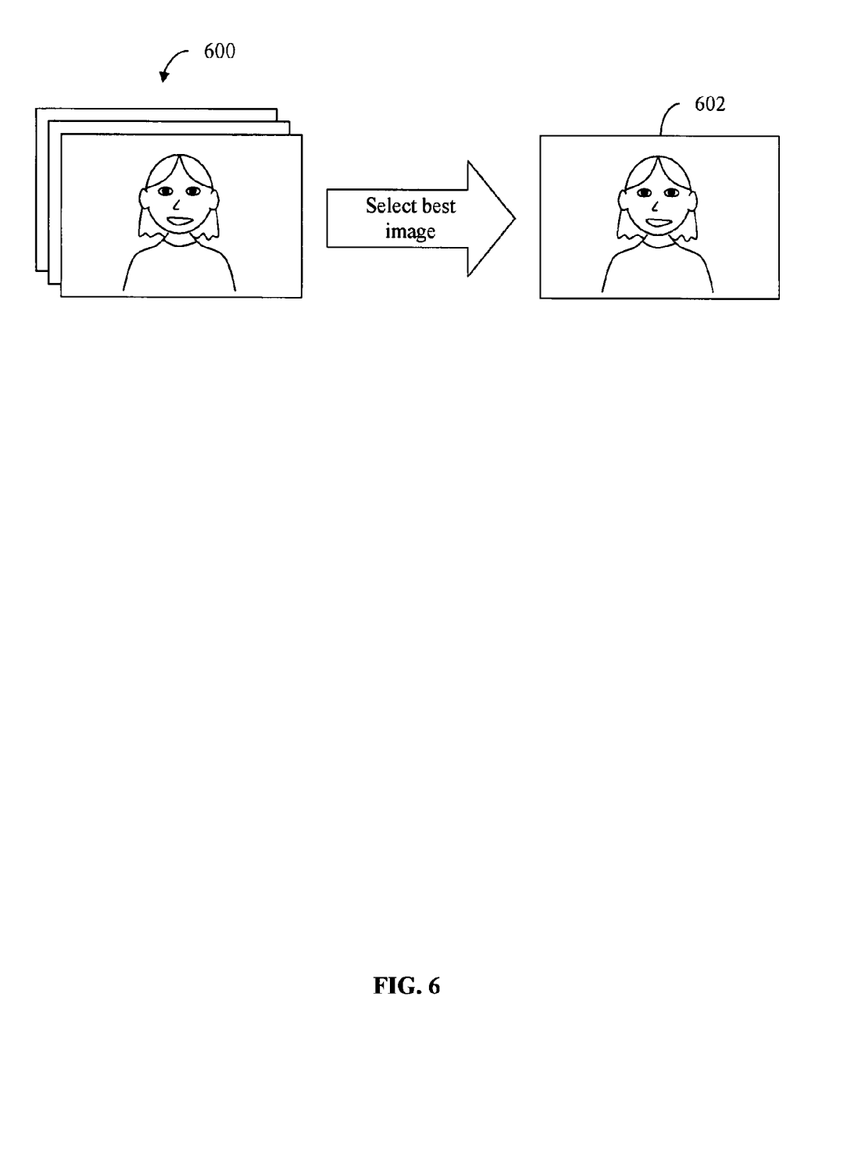
FIG. 6 is a diagram illustrating an embodiment in which attractiveness scores are used to automatically select an image from a set of images.

FIG. 6 is a diagram illustrating an embodiment in which attractiveness scores are used to automatically select an image from a set of images. In the example shown, set 600 includes a plurality of images. In some embodiments, set 600 is created or associated using automatic identification techniques. For example, the images in set 600 may be captured using a "burst mode" feature of a digital camera where multiple shots are taken quickly over a period of time. A process may automatically group burst mode shots together by examining the creation date and time of images; typically, digital images that are created using a burst mode have much smaller time intervals (e.g., on the order of a fraction of a second) than if a user manually took multiple shots. In some embodiments, a set of images is automatically identified using image analysis techniques. For example, similar color histograms may indicate similar images. In some embodiments, a set of images are manually created or identified. A user may, for example, create a set of images for a particular friend and add images to the set over time that include the friend (e.g., the user and the friend at a birthday party, the two of them with another friend sightseeing, etc.).

An attractiveness score is generated or otherwise obtained for each image in set 600. In various embodiments, attractive scores are generated on the fly or are retrieved (e.g., from metadata). Using the attractiveness scores for set 600, image 602 is selected from set 600. For example, the digital image with the largest attractiveness score is selected to be image 602. In various embodiments, selected image 602 is then further processed, is presented to a user, etc.

Figure 7:
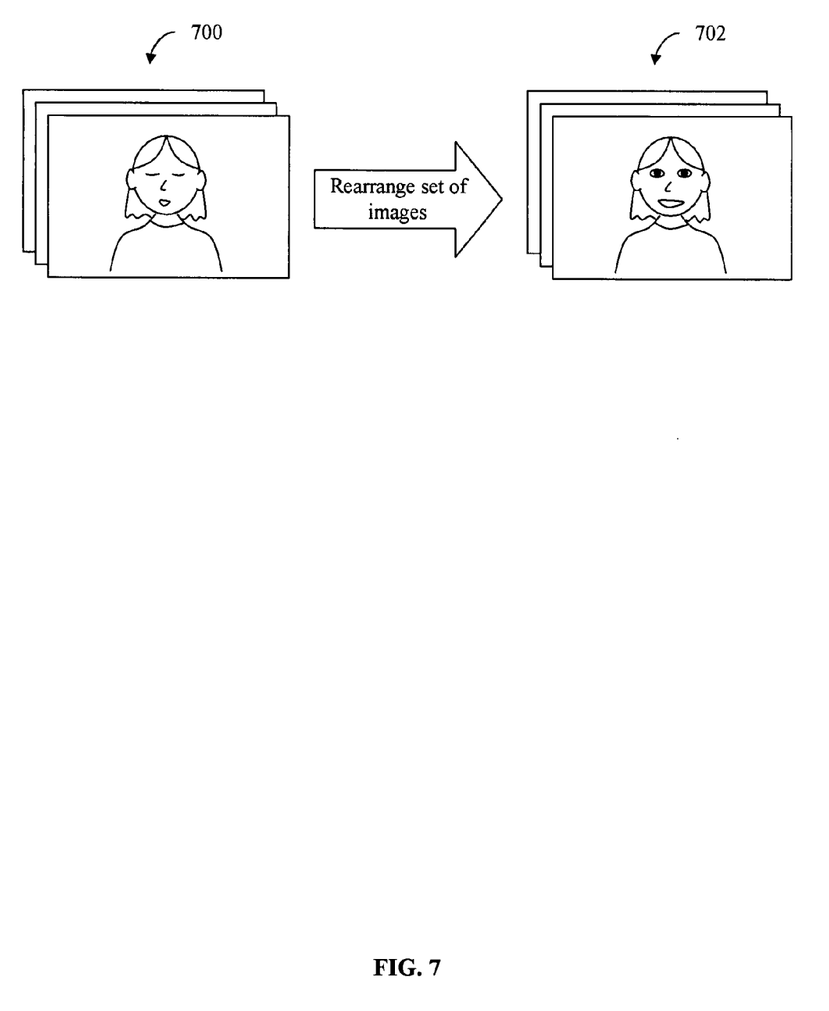
FIG. 7 is a diagram illustrating an embodiment of a set of images that are rearranged or resorted using attractiveness scores.

FIG. 7 is a diagram illustrating an embodiment of a set of images that are rearranged or resorted using attractiveness scores. In the example shown, sets 700 and 702 include the same images. In this example, images are displayed as being stacked on top of each other and the digital image that is first or on top according to a stacking order is the primary digital image shown and only the edges of the other images are shown. In some embodiments, the edges displayed show the actual number of digital images in a set. In such embodiments, set 700 would actual contain three images. In some embodiments (e.g., for relatively large sets with hundreds or thousands of digital images), the actual number of images in a set is not necessarily shown.

Set 700 is sorted or arranged according to an original stacking order. For example, one image is first, another image is second, and so on. In various embodiments, set 700 is generated automatically or manually as described above with respect to FIG. 6 and an original stacking order is generated by a user or automated process. For example, if set 700 is generated or identified using automated techniques, the stacking order may correspond to the time at which each image was taken. If set 700 is generated or identified using manual means, the stacking order may correspond to the order in which a user added each image to the set.

For each image in set 700, an attractiveness score is obtained (e.g., generated on the fly or retrieved from metadata associated with a respective image). Using the attractiveness scores, the set of images are rearranged to have a new stacking order. In some embodiments, the image with the highest/lowest score is pulled from set 700 and put in front/on top of set 702 while maintaining the relative stacking order of the rest of the images in the set. In some embodiments, all images in a set are rearranged in ascending/descending order based on attractiveness score. In this example, a large attractiveness score corresponds to an attractive or desirable face and the image in set 700 with the largest attractiveness score is placed on top/first in set 702.

In some embodiments, a rearranged set (e.g., set 702) is displayed by a file system associated with an operating system. For example, some operating systems have an understanding of sets of images and may represent the set collectively as a logical group rather than displaying each image individually. In some embodiments, a software application (e.g., for editing, storing, searching, tagging, or in general managing digital images) displays a rearranged set of images (e.g., set 702).

Figure 8:
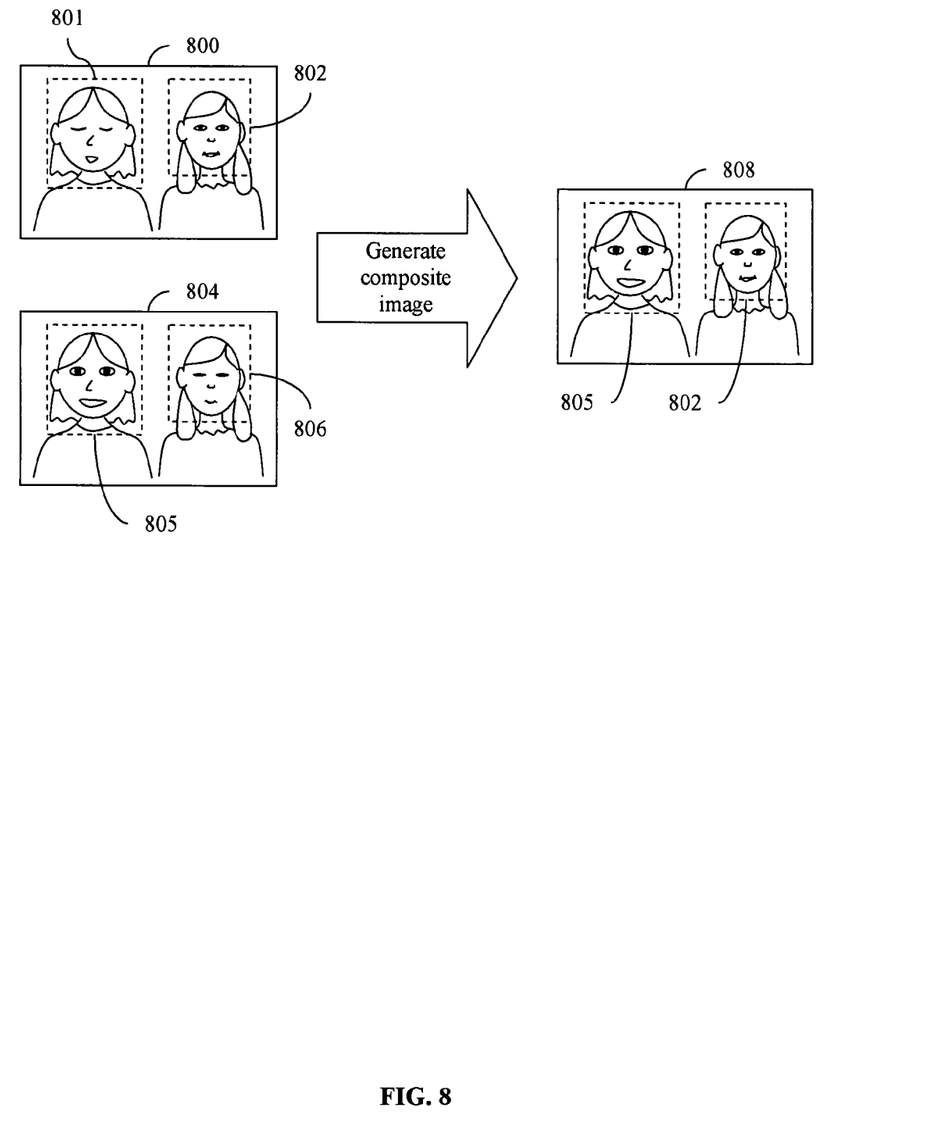
FIG. 8 is a diagram illustrating an embodiment of a composite image that is generated using attractiveness scores.

FIG. 8 is a diagram illustrating an embodiment of a composite image that is generated using attractiveness scores. In the example shown, image 800 includes heads 801 and 802 and image 804 includes heads 805 and 806. In both images 800 and 804, at least one person is blinking. Composite image 808 is generated using head 805 and head 802. In this example, the heads used or otherwise included in composite image 808 are selected based on attractiveness values. Attractiveness scores are obtained for heads 801, 802, 805 and 806 (e.g., generated on the fly when needed, retrieved from metadata associated with images 800 or 804, etc.). The attractiveness scores for heads 802 and 806 are compared; based on the comparison, head 802 is selected to be included in composite image 808. Similarly, the attractiveness scores for heads 801 and 805 are compared and head 805 is selected to be included in composite image 808.

In some embodiments, attractiveness scores are used to generate an initial composite image. For example, after being presented with composite image 808, a user may make changes to composite image 808 manually, including replacing a head in a composite with one from another source image, etc.

In some embodiments, the system finds the faces from each of the images in the stack, identifies which faces correspond to the same person (based being in the same locations in each image in the stack), determines attractiveness scores for each face, and generates a composite image, in which the most attractive face for each person is used. The user could then switch to another face for each person. For example, a mouse click on a face could toggle to the next-most-attractive version of it. Faces from different images may be composited together using existing techniques, such as Interactive Digital Photomontage (http://grail.cs.washington.edu/projects/photomontage/).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining a digital image;
    detecting a face depicted in the digital image;
    obtaining a set of characteristics, wherein the set of characteristics are associated with at least some portion of a face;
    generating an attractiveness score based at least in part on the detected face and the set of characteristics; and
    normalizing the detected face by performing at least one of: rotating the detected face to be vertical, re-sizing the detected face to a normalized size, or moving the detected face to a centered position, wherein rotating the detected face to be vertical includes:
        determining a dominant gradient direction associated with the eyes of the detected face; and using the dominant gradient direction to rotate the detected face.

2. A method as recited in claim 1 further including:
generating a value for each of the set of characteristics; and
combining the generated values for the set of characteristics to obtain the attractiveness score.

3. A method as recited in claim 2, wherein combining includes using a linear combination.

4. A method as recited in claim 2, wherein the value is generated by a learning machine trained to evaluate the set of characteristics.

5. A method as recited in claim 4, wherein training includes using at least one of: a neural network, AdaBoost, or a support vector machine (SVM).

6. A method as recited in claim 4, wherein training includes using Soft Cascade.

7. A method as recited in claim 1, wherein the set of characteristics includes at least one of: openness of a person's eyes, straightforwardness of a person's face, smiling, or a size of a person's face depicted in the digital image.

8. A method as recited in claim 1, wherein there is a plurality of faces depicted in the digital image and attractiveness values are generated for a subset of the plurality of faces.

9. A method as recited in claim 8, wherein:
the method further includes determining sizes for the plurality of faces detected in the digital image; and
the subset of the plurality of faces for which attractiveness values are generated have a size greater than a threshold.

10. A method as recited in claim 1 further including storing the attractiveness value in metadata associated with the digital image.

11. A method as recited in claim 1, wherein moving the detected face to a centered position includes:
determining a vertical axis of symmetry associated with the detected face; and
using the vertical axis of symmetry to move the detected face.

12. A method as recited in claim 1 further including:
dividing at least some portion of the detected face into a comprehensive set of locations;
performing facial expression recognition on the comprehensive set of locations, wherein there is an output for each location in the set; and
determining a facial expression associated with the detected face based at least in part on the outputs.

13. A method as recited in claim 12, wherein determining the facial expression is based at least in part on a weighted average.

14. A method as recited in claim 12, wherein determining the facial expression is based at least in part on the minimum and maximum outputs.

15. A method as recited in claim 12, wherein determining the facial expression is based at least in part on the number of outputs that are above or below a threshold.

16. A method as recited in claim 12, wherein performing facial expression recognition includes detecting whether eyes are open or closed.

17. A method as recited in claim 12, wherein performing facial expression recognition includes detecting a smiling or serious expression.

18. A method, comprising:
obtaining a digital image;
obtaining an attractiveness score associated with a face depicted in the digital image;
determining a display to present based at least in part on the attractiveness score; and
presenting the display:
wherein:
there is a plurality of digital images and a plurality of attractiveness scores are obtained for the plurality of digital images;
the plurality of digital images are arranged in an original stacking order, and
determining the display includes determining a new stacking order based at least in part on the plurality of attractiveness scores.

19. A method as recited in claim 18, wherein the method is performed by a camera.

20. A method as recited in claim 18, wherein:
there is a plurality of digital images and a plurality of attractiveness scores are obtained for the plurality of digital images; and
determining the display includes selecting one of the plurality of digital images to be presented based at least in part on the plurality of attractiveness scores.

21. A method as recited in claim 18, wherein:
there is a plurality of digital images and a plurality of attractiveness scores are obtained for the plurality of digital images; and
determining the display includes automatically generating a composite image that includes a plurality of faces obtained from the plurality of digital images and the plurality of faces in the composite image are automatically selected based at least in part on the plurality of attractiveness scores.

22. A method as recited in claim 21, further comprising:
receiving a user input associated with one of the plurality of faces in the composite image; and
modifying the composite image so that the face for which a user input is received is changed to one with a next best attractiveness score.

23. A method as recited in claim 18, wherein the attractiveness score is obtained from metadata associated with the digital image.

24. A computer program product, the computer program product being embodied in a non-transitory computer readable medium and comprising computer instructions for:
obtaining a digital image;
obtaining an attractiveness score associated with a face depicted in the digital image;
determining a display to present based at least in part on the attractiveness score; and
presenting the display:
wherein:
there is a plurality of digital images and a plurality of attractiveness scores are obtained for the plurality of digital images;
the plurality of digital images are arranged in an original stacking order, and
determining the display includes determining a new stacking order based at least in part on the plurality of attractiveness scores.

25. A method, comprising:
obtaining a digital image;
detecting a face depicted in the digital image;
obtaining a set of characteristics, wherein the set of characteristics are associated with at least some portion of a face;
generating an attractiveness score based at least in part on the detected face and the set of characteristics;
generating a value for each of the set of characteristics, wherein the value is generated by a learning machine trained using Soft Cascade to evaluate the set of characteristics; and combining the generated values for the set of characteristics to obtain the attractiveness score.

26. A method, comprising:
obtaining a digital image;
detecting a face depicted in the digital image;
obtaining a set of characteristics, wherein the set of characteristics are associated with at least some portion of a face;
generating an attractiveness score based at least in part on the detected face and the set of characteristics, wherein there is a plurality of faces depicted in the digital image and attractiveness values are generated by a processor for a subset of the plurality of faces; and
determining sizes for the plurality of faces detected in the digital image;
wherein the subset of the plurality of faces for which attractiveness values are generated have a size greater than a threshold.

27. A method, comprising:
obtaining a digital image;
detecting a face depicted in the digital image;
obtaining a set of characteristics, wherein the set of characteristics are associated with at least some portion of a face;
generating an attractiveness score based at least in part on the detected face and the set of characteristics, wherein generating is performed by a processor; and
normalizing the detected face by performing at least one of: rotating the detected face to be vertical, re-sizing the detected face to a normalized size, or moving the detected face to a centered position, wherein moving the detected face to a centered position includes:
determining a vertical axis of symmetry associated with the detected face; and
using the vertical axis of symmetry to move the detected face.

28. A method, comprising:
obtaining a digital image;
obtaining an attractiveness score associated with a face depicted in the digital image;
determining a display to present based at least in part on the attractiveness score; and
presenting the display;
wherein:
there is a plurality of digital images and a plurality of attractiveness scores are obtained for the plurality of digital images; and
determining the display includes automatically generating a composite image that includes a plurality of faces obtained from the plurality of digital images and the plurality of faces in the composite image are automatically selected based at least in part on the plurality of attractiveness scores.

29. A method as recited in claim 28, wherein the method is performed by a camera.

30. A method as recited in claim 28, wherein:
there is a plurality of digital images and a plurality of attractiveness scores are obtained for the plurality of digital images; and
determining the display includes selecting one of the plurality of digital images to be presented based at least in part on the plurality of attractiveness scores.

31. A method as recited in claim 28, further comprising:
receiving a user input associated with one of the plurality of faces in the composite image; and
modifying the composite image so that the face for which a user input is received is changed to one with a next best attractiveness score.

32. A method as recited in claim 28, wherein the attractiveness score is obtained from metadata associated with the digital image.

33. A computer program product, the computer program product being embodied in a non-transitory computer readable medium and comprising computer instructions for:
obtaining a digital image;
obtaining an attractiveness score associated with a face depicted in the digital image;
determining a display to present based at least in part on the attractiveness score; and
presenting the display;
wherein:
there is a plurality of digital images and a plurality of attractiveness scores are obtained for the plurality of digital images; and
determining the display includes automatically generating a composite image that includes a plurality of faces obtained from the plurality of digital images and the plurality of faces in the composite image are automatically selected based at least in part on the plurality of attractiveness scores.

34. A system, comprising:
a processor; and
a memory coupled with the processor, wherein the memory is configured to provide the processor with instructions which when executed cause the processor to:
obtain a digital image;
obtain an attractiveness score associated with a face depicted in the digital image;
determine a display to present based at least in part on the attractiveness score; and
present the display;
wherein:
there is a plurality of digital images and a plurality of attractiveness scores are obtained for the plurality of digital images; and
determining the display includes automatically generating a composite image that includes a plurality of faces obtained from the plurality of digital images and the plurality of faces in the composite image are automatically selected based at least in part on the plurality of attractiveness scores.

35. A system, comprising:
a processor; and
a memory coupled with the processor, wherein the memory is configured to provide the processor with instructions which when executed cause the processor to:
obtain a digital image;
obtain an attractiveness score associated with a face depicted in the digital image;
determine a display to present based at least in part on the attractiveness score; and
present the display;
wherein:
there is a plurality of digital images and a plurality of attractiveness scores are obtained for the plurality of digital images;
the plurality of digital images are arranged in an original stacking order, and
determining the display includes determining a new stacking order based at least in part on the plurality of attractiveness scores.

* * * * *